April 21, 1942.  I. R. METCALF  2,280,126
METHOD OF AND APPARATUS FOR GUIDING AIRCRAFT
Filed July 26, 1938  2 Sheets-Sheet 2

| Attitude of Airplane | Position of Airplane | | | | |
|---|---|---|---|---|---|
| | On Path | Above Path | Below Path | To Left of Path | To Right of Path |
| Nose Level | | | | | |
| Nose Above Level | | | | | |
| Nose Below Level | | | | | |
| Right Bank | | | | | |
| Left Bank | | | | | |
| Nose to Right | | | | | |
| Nose to Left | | | | | |

Inventor:
Irving R. Metcalf
By Potter, Pierce & Scheffler,
Attorneys.

Patented Apr. 21, 1942

2,280,126

UNITED STATES PATENT OFFICE 2,280,126

METHOD OF AND APPARATUS FOR GUIDING AIRCRAFT

Irving R. Metcalf, Washington, D. C., assignor to Research Corporation, New York, N. Y., a corporation of New York Application July 26, 1938, Serial No. 221,457

10 Claims. (Cl. 177—352)

This invention relates to methods of and apparatus for guiding aircraft and particularly to methods of and apparatus for guiding an aircraft as it approaches a landing field.

Objects of this invention are to provide methods of and apparatus for obtaining at the aircraft a view of, or a simulation of a view of, three points at the landing field which determine the desired inclined plane of approach to the field, one of the points approximately coinciding with the desired point of landing on the field and the other points being laterally spaced from and elevated above the landing point.

An object of the invention is to provide apparatus whereby a linear landing path having a proper inclined relation to the runways or surface of a landing field may be defined and be made sensible to the pilot or observer in the aircraft so that he may be apprised of the position and attitude of the aircraft with respect to such landing path as he approaches the landing field or space and may thereby be enabled, when necessary, to correct such position and attitude to follow the desired landing path, thus insuring descent of the aircraft toward the landing field or space in such relation thereto as to make a safe landing.

The term "position" is used in the customary manner to designate the location of the center of gravity of the aircraft with respect to a predetermined path, i. e. the desired inclined approach path of the aircraft; and the term "attitude" is similarly used in the customary sense to designate the relative location of the longitudinal, transverse and vertical axes of the aircraft with respect to the path of travel of its center of gravity. The term "landing field" includes not only an airport location for land planes but a selected area for the landing of seaplanes.

The invention contemplates apparatus for assisting in the landing of aircraft, including terrestrially located devices preferably so arranged as to determine a hypothetical slanting plane defining a landing path at a predetermined appropriate angle to the landing field, and apparatus carried by the aircraft for visually registering, within view of the pilot or observer, the apparent location of the terrestrially located devices as viewed or sensed from the aircraft, all as will be explained hereinafter more fully and finally claimed.

More specifically, an object of the invention is to provide, on the landing field, three radiant energy sources, such as significant flags or lights, which determine the inclined plane along which the transverse axis of the aircraft should approach the field for landing, one such source corresponding to the desired landing point and the other sources being at elevated positions and at opposite sides of the landing point.

These and other objects and advantages of the invention will be apparent from the following specification when taken with the accompanying drawings in which.

Figures 3, 4:
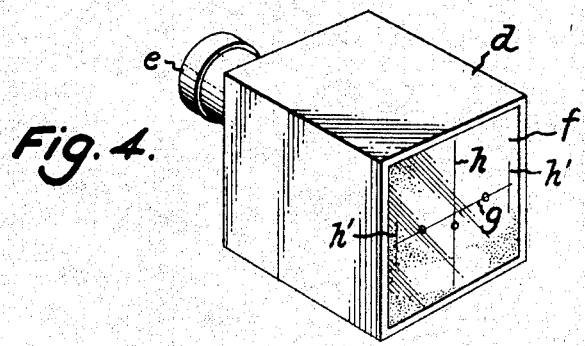

Fig. 3 is a chart showing various visual representations of the apparent locations of the terrestrially located devices as viewed or sensed from the aircraft; and Fig. 4 is a perspective view of one form of apparatus, for example optical apparatus such as a camera having a ground glass screen, which may be employed in the aircraft for producing the visual registration of the apparent location of the terrestrially located devices that define the three significant points of the landing plane.

Figure 1:
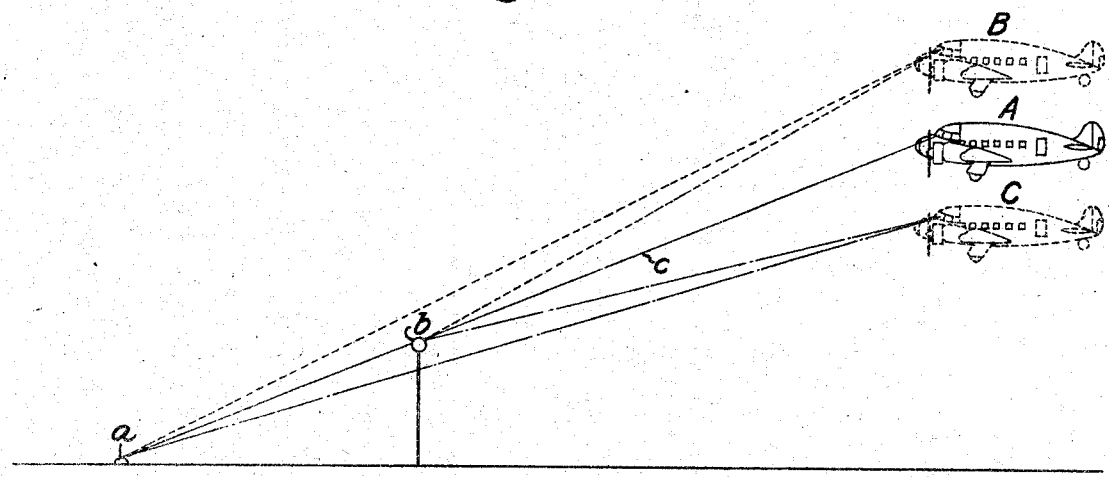
Fig. 1 is a diagrammatic representation illustrating, in side view, an embodiment of the invention.

For purposes of description of the invention, it may be assumed that the terrestrially located devices comprise three markers $a$, $b$ and $b'$, preferably in the arrangement of an isosceles triangle, the marker $a$ being located upon the central axis of the runway and approximately at the desired landing point, and the markers $b$ and $b'$ being located at appropriately equal distances laterally from such central axis, and clear of the runway, and elevated above ground level at a height sufficient to determine, in combination with the marker $a$ a hypothetical plane which slopes upwardly from the ground and includes the desired landing path $c$, Fig. 1, the plane being at such an angle to the surface of the field as may be desirable for proper and safe landing of aircraft descending along such defined path.

The markers may be visible markers such as flags or lights, capable of being viewed from a position within the aircraft, or they may constitute sources of emanation of non-visible energy such as infra-red radiators which may be received by and appropriately registered upon suitable energy receiving means carried by the aircraft and capable of producing a visual representation of the apparent location of the markers as viewed or sensed from the aircraft.

In the case of visible radiant emanations from flags or lights, the aircraft may be provided with a camera $d$, Fig. 4, having an appropriate lens assembly $e$ and a ground glass screen $f$, provided with cross-hairs $g$ and $h$ defining, respectively, horizontal and vertical axes corresponding to the similar normal transverse and vertical axes of the aircraft. Alternatively, the cross-hairs may be etched or marked on the glass window of the aircraft in front of the pilot's seat.

Figure 2:
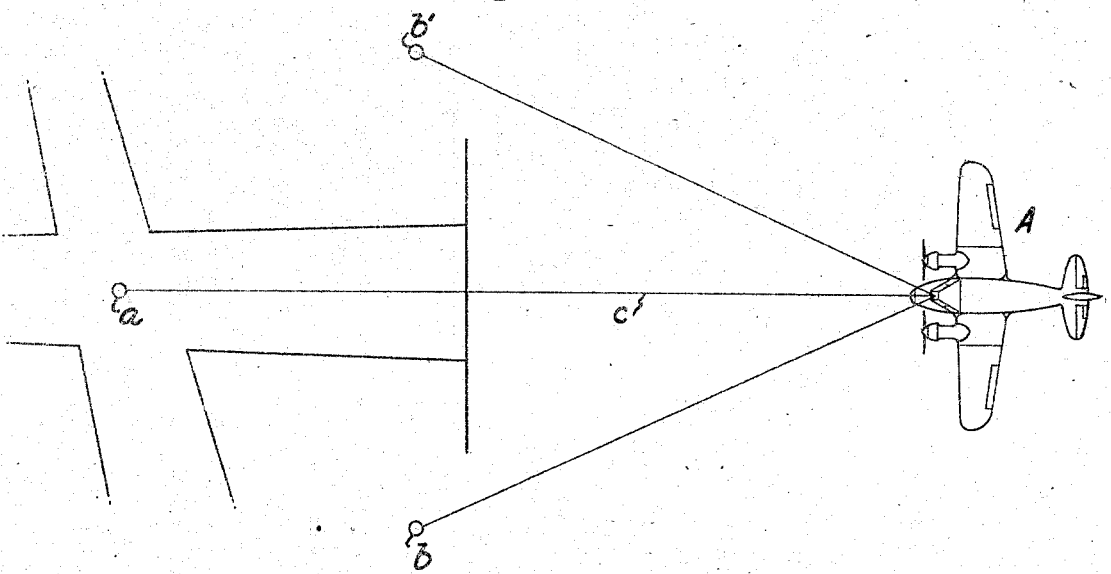
Fig. 2 is a plan view of the same.

As will readily be appreciated, the position of the aircraft, as hereinbefore defined, may be above or below and/or to the right or left of the desired landing path $c$. As shown in Figs. 1 and 2, the airplane A is on the desired path $c$ and flying directly towards the marker $a$ which is located at or approximately at the intended landing point. Consideration of Figs. 1 and 2 will show that the visual indication of points $a$, $b$, $b'$ at the airplane A will be that of three equally spaced points in horizontal alinement, as is indicated by the diagram at the upper left corner of Fig. 3.

If the aircraft is above the desired landing plane, for example in the position indicated by the airplane B of Fig. 1, the dotted lines extending from the markers to the airplane show that the marker $a$ will be sensed on the airplane as being above the laterally arranged markers or points $b$, $b'$. The relative location of the markers, as viewed from the airplane B will be as shown in the diagram of the upper line, second column of Fig. 3. Similarly, an airplane C which approaches the landing field at a level below the desired landing plane will obtain a visual indication of the markers as shown in the upper line, third column of Fig. 3.

Positions of the approaching aircraft to the left and to the right of the desired path $c$ are not illustrated in Fig. 2 but it will be obvious that, for such positions of approach and for aircraft moving in the desired landing plane, the appearance of the three markers at the aircraft will be as shown by the diagrams at the upper line, the fourth and fifth columns respectively, of Fig. 3.

The attitude of the aircraft at each of the described positions will vary with the location of the transverse and vertical axes of the aircraft with respect to the vertical plane of the path of movement of the center of gravity of the aircraft. As indicated by the legends in the first column of the tabulation of Fig. 3, the nose of the aircraft may be above or below level, corresponding respectively to a climb or a dive with respect to the desired landing plane; the aircraft may be in a right or a left bank as it moves towards the landing field, or the aircraft may be level but with its nose directed either towards the right or the left of its path of travel.

The appearance of the points $a$, $b$, $b'$ for the several possible conditions of approach is shown by the tabulation of Fig. 3 but will not be described in detail. It is to be understood that this tabulation corresponds to the actual appearance of the three markers $a$, $b$, $b'$ as viewed from the aircraft. The line through the two outer visual spots corresponding to markers $b$, $b'$ indicates whether or not the aircraft is approaching the landing field on a horizontal keel, and the horizontal position of the central spot with respect to the outer spots indicates the directions by which the aircraft position and attitude depart from the desired position and attitude. In the case of a visual indication obtained by a camera, Fig. 4, the position of the spots on the ground glass indicates the direction for correction of the position and attitude of the aircraft to bring it to the desired landing path. For example, the camera or reversed indication at an airplane B above the approach plane will be as shown in Fig. 4; i. e. as the reverse of the corresponding direct indication noted at the upper line, second column of Fig. 3. The center spot appears on the camera ground glass below the horizontal line of the outer spots and indicates that the nose of the airplane should be depressed to bring the aircraft down to the desired landing path.

The distance between the two outer spots corresponding to the lateral markers $b$, $b'$, increases as the aircraft approaches the landing field and the pilot therefore obtains an indication of his altitude or distance from the landing point from the spacing of the outer markers or their visual indicator spots along the horizontal cross-hair $g$. The width of the ground glass $f$ of an optical instrument such as a camera may be such that the outer spots pass laterally from the screen when the aircraft reaches that height above the field at which the pilot should position the airplane for the landing contact. Alternatively, as shown in Fig. 4, auxiliary vertical lines $h'$ may be marked on the viewing glass or screen to indicate the lateral spacing of the outer markers which corresponds to the critical elevation at which the aircraft should be on the landing path $c$ and in preparation for immediate landing.

The markers may take the form of buoys, with lights at night, when seaplanes are to be guided to a safe landing. It frequently is difficult for the pilot to estimate his position as he approaches the surface of the water. The three markers points definitely establish the desired landing plane and landing path, and the pilot may readily judge the position and attitude of the aircraft as it approaches the landing point.

It is believed to be broadly new to provide a single visual indicator which affords the pilot full information as to the position of the aircraft with respect to a preselected landing path, the attitude of the aircraft, and the approximate elevation of the aircraft. Prior landing systems have required two or more instruments to furnish the information that the pilot obtains by viewing the three markers from the aircraft or, alternatively, by viewing the visual indications produced on the aircraft of the three points on the landing field which determine the plane of approach and the landing path. It is to be understood that there is considerable latitude in the design of the devices at the field which radiate emanations from the three selected points and in the design of the devices on the aircraft for producing visual point indications corresponding to the three points on the landing field. The method of the invention may be carried out with visible light rays, invisible rays and/or radio waves when the apparatus on the aircraft is appropriately designed to afford the desired visual indication of the relative positions of the three significant points as viewed from the aircraft.

It is therefore to be understood that there is considerable latitude in the design and construction of the apparatus contemplated by this invention and that apparatus differing materially from that herein shown and described falls within the spirit of my invention as set forth in the following claims.

I claim:

1. The method of guiding aircraft along a linear inclined path on approaching a field for landing which comprises emanating radiant energy from a plurality of points at the field to define in space the inclined plane in which the desired linear and inclined approach path is located; and producing on the aircraft from said emanated radiant energy a visual image of three spots in the relative relationship, as viewed from the aircraft, of three points in the said inclined plane, one point being the desired point of contact of the desired approach path with the landing field and the other points being above and symmetrically located with respect to the first point.

2. The method of obtaining on an aircraft approaching a landing field an indication of the attitude of the aircraft and its position with reference to a substantially linear landing path which comprises radiating energy from the field from approximately the desired landing point, and radiating energy from two points above the field and symmetrically disposed with respect to the desired landing point in the inclined plane along which the transverse axis of the aircraft travels as it approaches along the linear landing path.

3. Means for assisting in the landing of aircraft, including terrestrially located means emitting radiations from a plurality of points in the inclined plane of and symmetrically disposed with respect to the desired landing path, and means on the aircraft and responsive to said radiations to produce an image of three spots simulating by their relative locations a direct view of the contact point of the landing path with the landing field surface and of two points above the landing field and symmetrically located with respect to the landing field and the landing path, said image apprising the pilot of the position and attitude of the aircraft with respect to the landing path.

4. In apparatus for assisting in the landing of aircraft, means for radiating energy from a landing field to produce in space an energy field symmetrical about the desired inclined plane of approach to the landing area and about a desired linear landing path in said inclined plane, and means carried by the aircraft and responsive to energy radiated from said means for visually registering three points corresponding respectively to the point of contact of the inclined landing path with the field and to two elevated points at opposite sides of the first point and in said inclined plane.

5. Means for assisting in the landing of aircraft, including terrestrially located means for radiating energy from three spaced points in a slanting plane which includes the desired landing path, one of said points being the desired landing point and the other points being at opposite sides of and symmetrical with respect to the desired landing path, whereby a view of said points from a position on the aircraft is indicative of the position and attitude of the aircraft with respect to the landing path, and means carried by the aircraft for visually registering the location of the said points, said registering means including a screen marked with a horizontal and a vertical axis, whereby the locations of said visually registered points are indicative of the location of the aircraft with respect to the landing path and the relation of the horizontal and vertical axes of the aircraft with respect to a vertical plane through the landing path.

6. Means for assisting in the landing of aircraft, including three terrestrial markers defining a triangle, one of said markers being at the contact point on the landing field of a desired linear approach path and the other two of said markers being arranged at a higher level, and the three markers thereby determining a slanting plane which includes the desired linear landing path, said markers serving by their apparent relation as viewed from the aircraft to apprise the pilot of the position and attitude of the aircraft with respect to the landing path.

7. Means for assisting in the landing of aircraft, including three terrestrial markers in the inclined plane of a desired linear landing path, one marker being located at the desired landing point and the other markers being above and symmetrically arranged with respect to said landing point, the markers serving by their apparent relation as viewed from the aircraft to apprise the pilot of the position and attitude of the aircraft with respect to the landing path, and means carried by the aircraft and in view of an observer therein for registering an indication of said apparent relation.

8. Means for assisting in the landing of aircraft, including three terrestrial markers in the inclined plane of a desired linear landing path, one marker being located at the desired landing point and the other markers being above and symmetrically arranged with respect to said landing point, the markers serving by their apparent relation as viewed from the aircraft to apprise the pilot of the position and attitude of the aircraft with respect to the landing path, and means carried by the aircraft and in view of an observer therein for registering with reference to indicated horizontal and vertical axes corresponding to similar transverse and vertical normal axes of the aircraft an indication of said apparent relation.

9. Apparatus for guiding aircraft to a landing on a field, said apparatus comprising the combination with three devices located at spaced points at the field in the desired inclined approach plane of the aircraft, two of said devices being at opposite sides of the desired approach path and the third device being at the desired landing point, of means on the aircraft for producing a visual indication of the relative positions of the three devices as sensed from the aircraft.

10. Apparatus as claimed in claim 9, wherein said devices comprise devices for radiating visible light rays, and said means comprises optical means having a screen upon which spots of light are formed to indicate the relative positions of said devices.

IRVING R. METCALF.